Nov. 2, 1937.  E. J. FEHR ET AL  2,098,184
AUTOMOBILE ELEVATING AND SUPPORTING STRUCTURE
Filed March 20, 1933  7 Sheets-Sheet 1
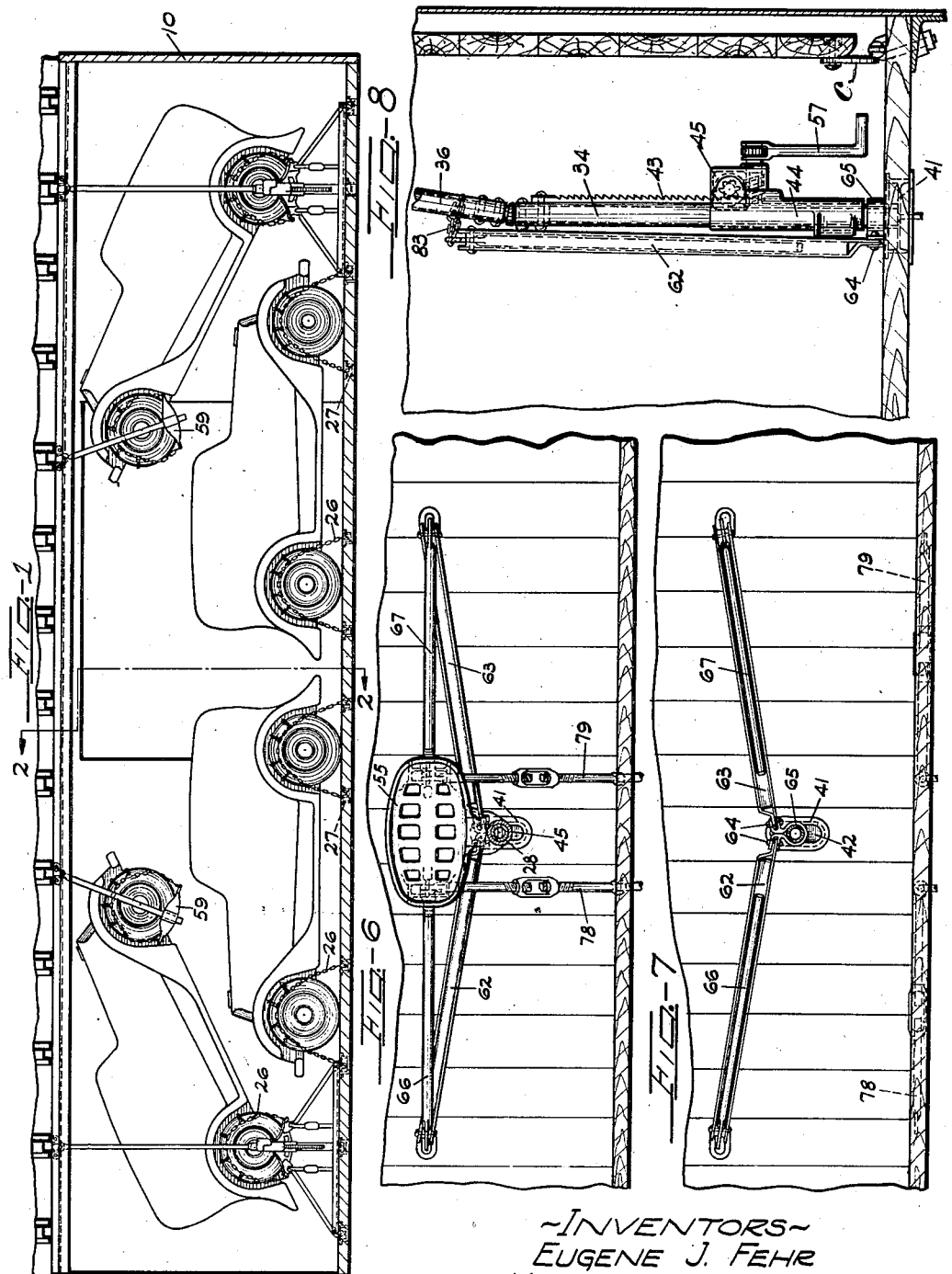
~INVENTORS~
EUGENE J. FEHR
KENNETH J. TOBIN
By~ Samuel Reese
ATTY.

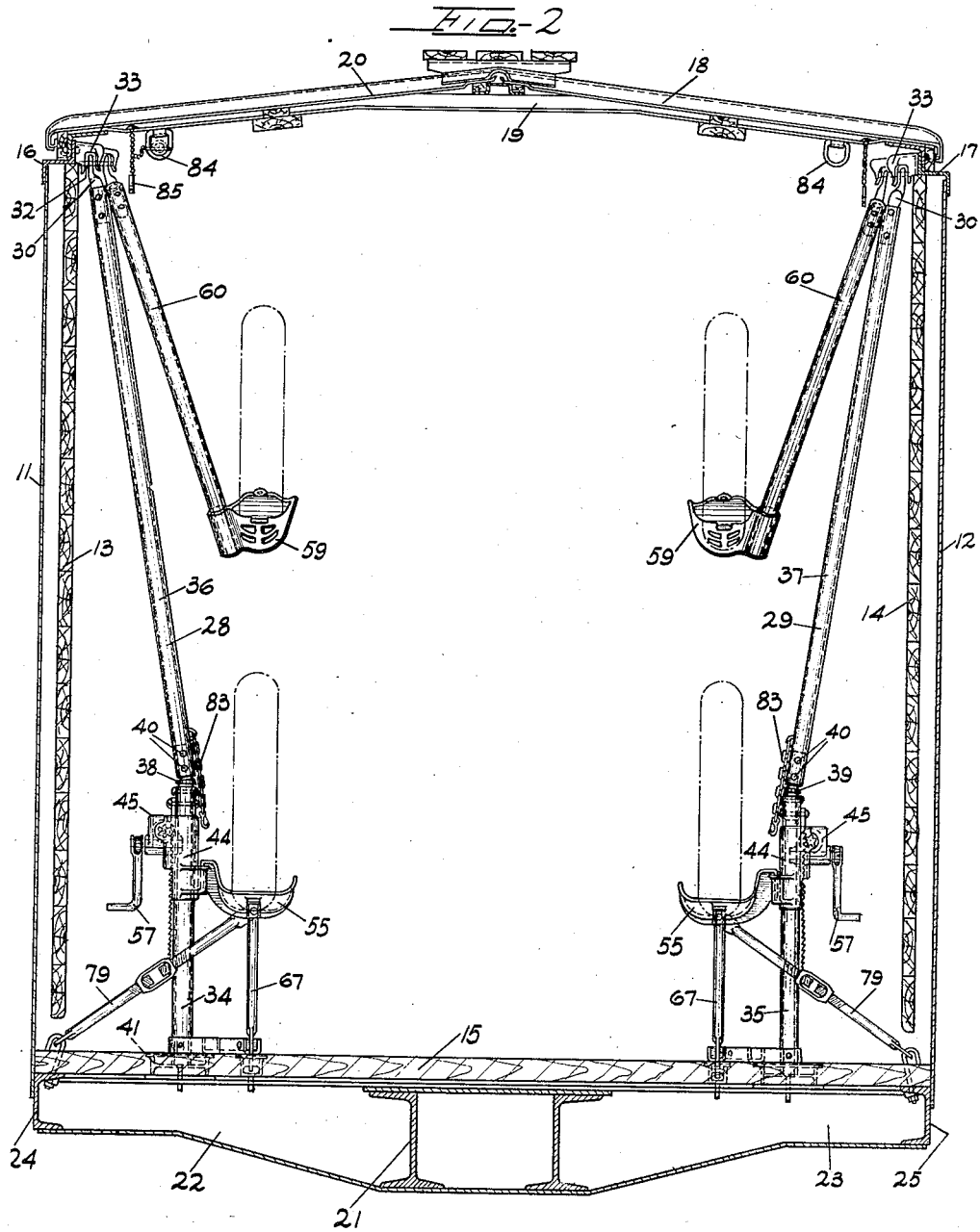

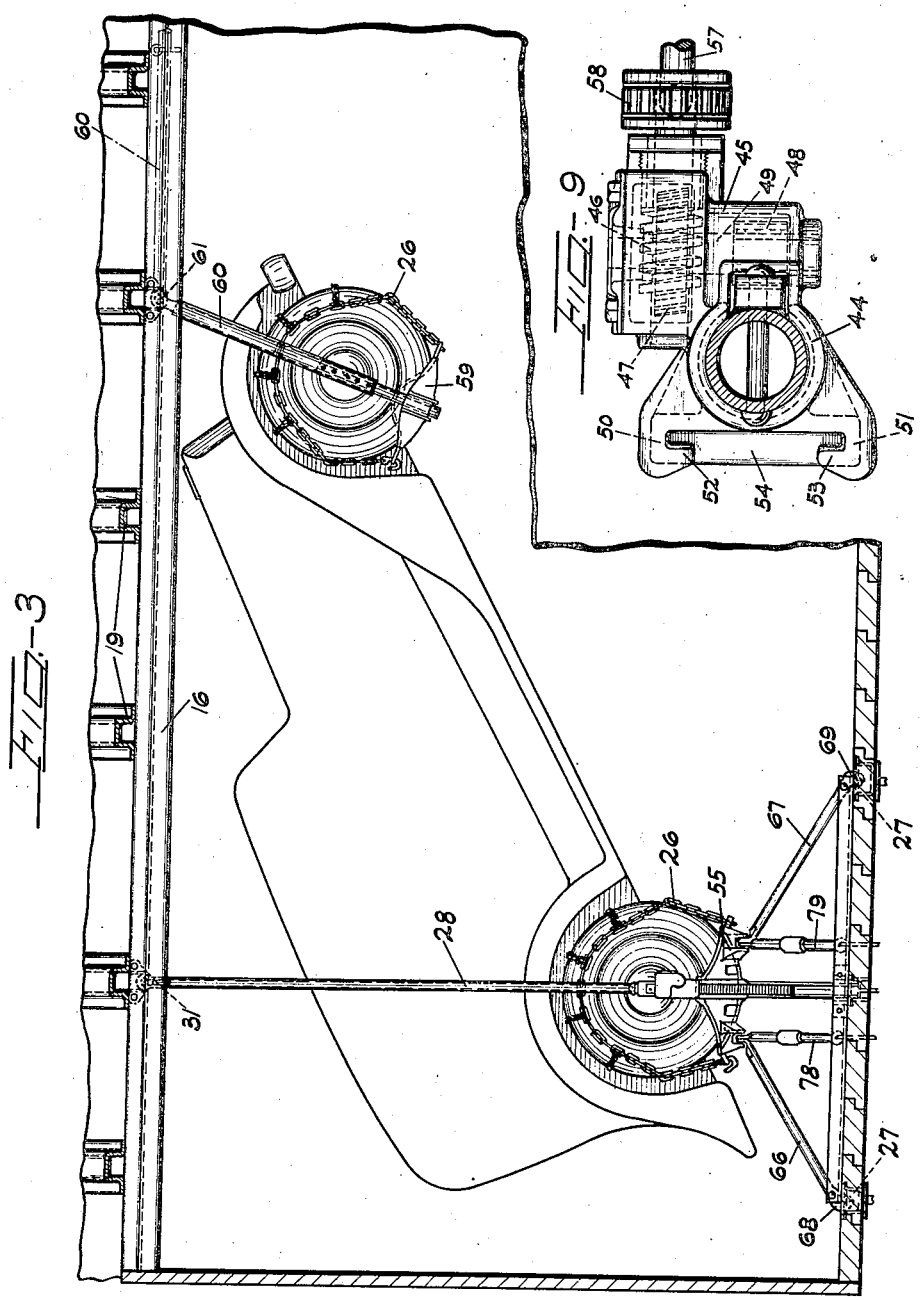

Nov. 2, 1937.  E. J. FEHR ET AL  2,098,184
AUTOMOBILE ELEVATING AND SUPPORTING STRUCTURE
Filed March 20, 1933  7 Sheets-Sheet 4
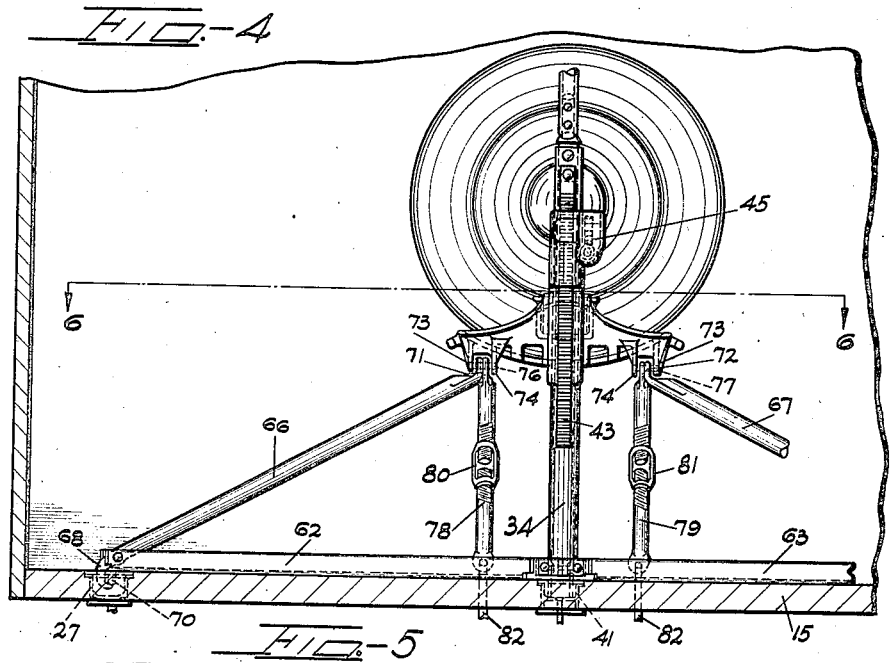
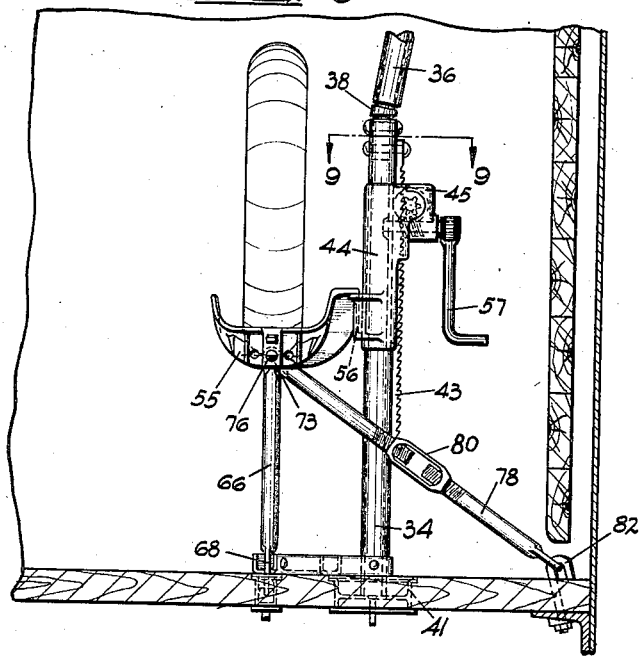
INVENTORS—
EUGENE J. FEHR
KENNETH J. TOBIN
By— Samuel Reese
ATTY.

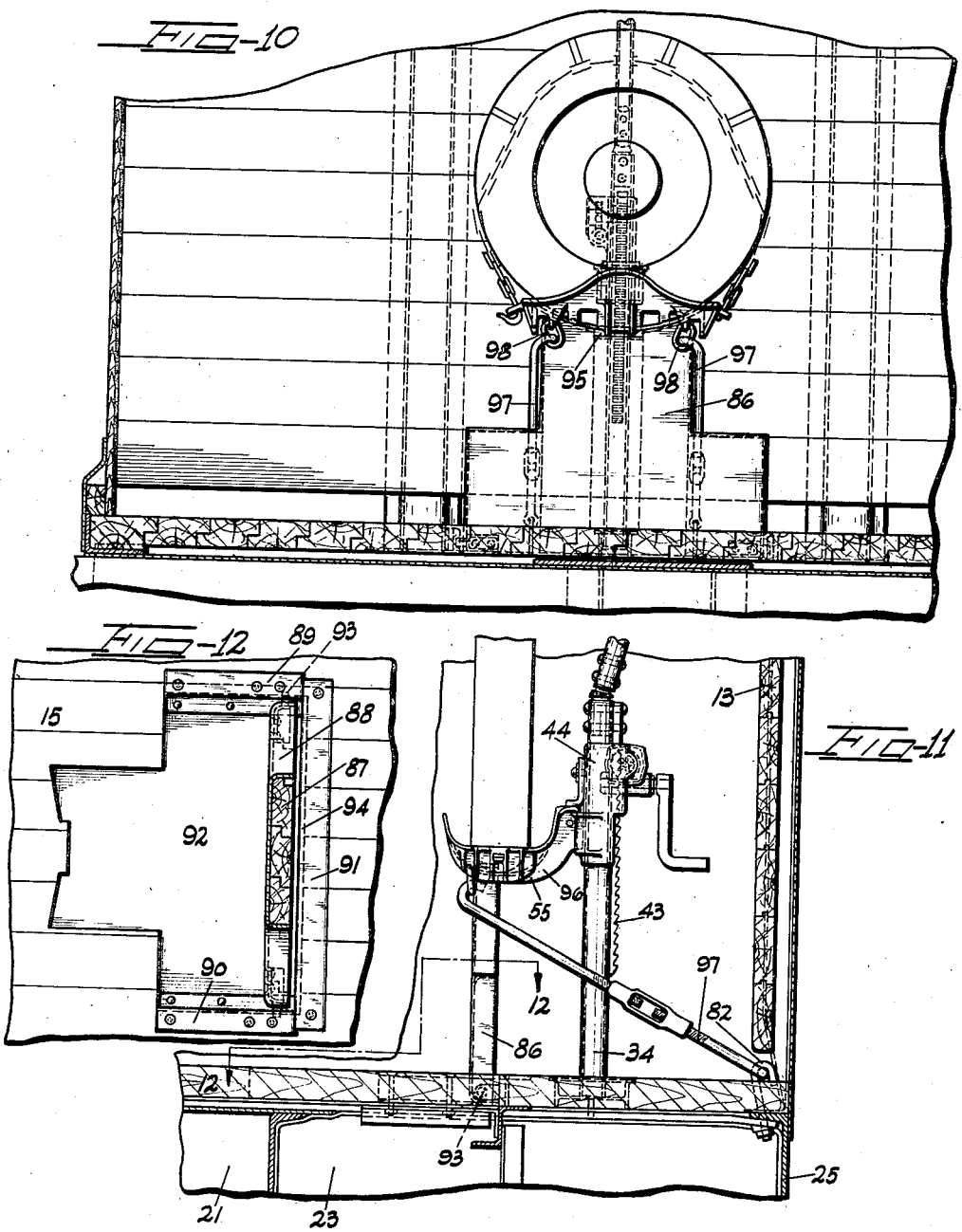

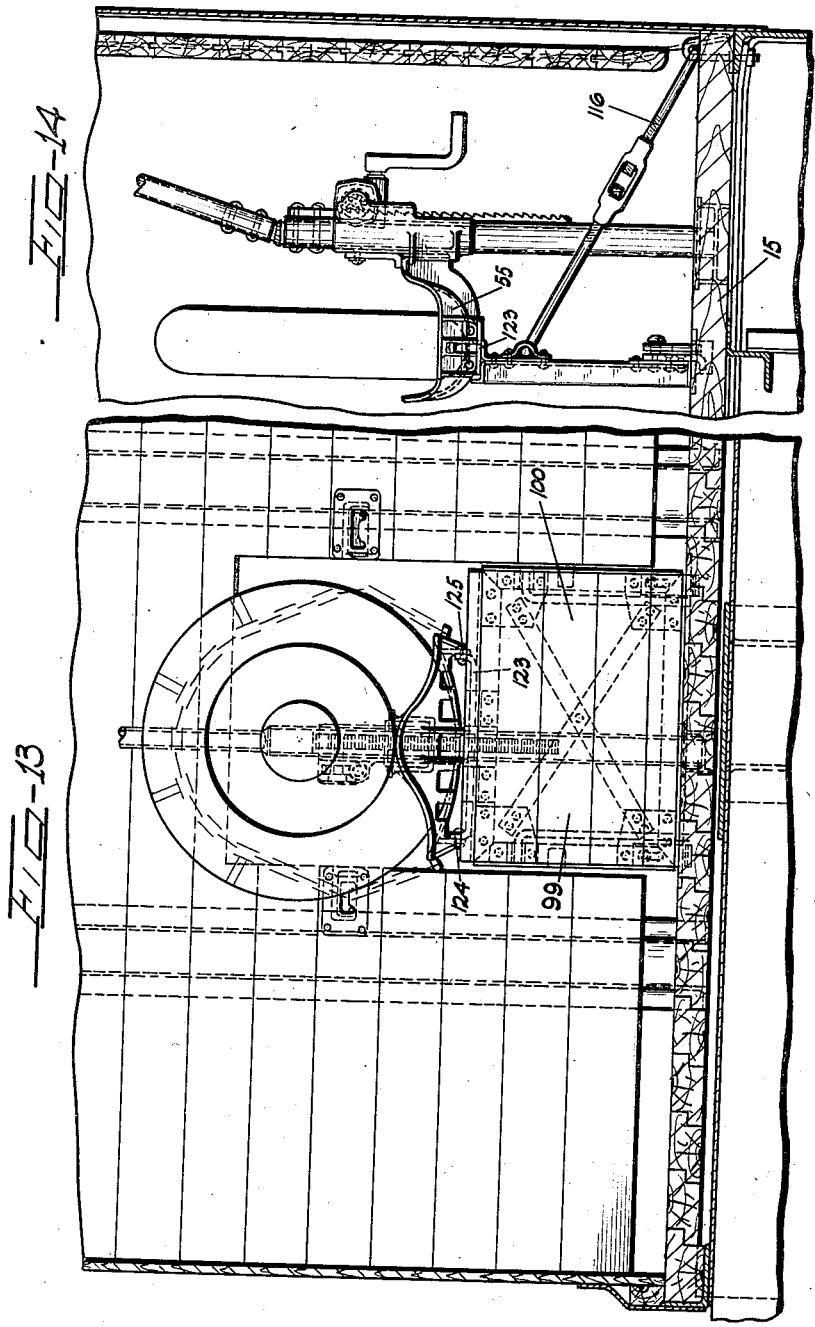

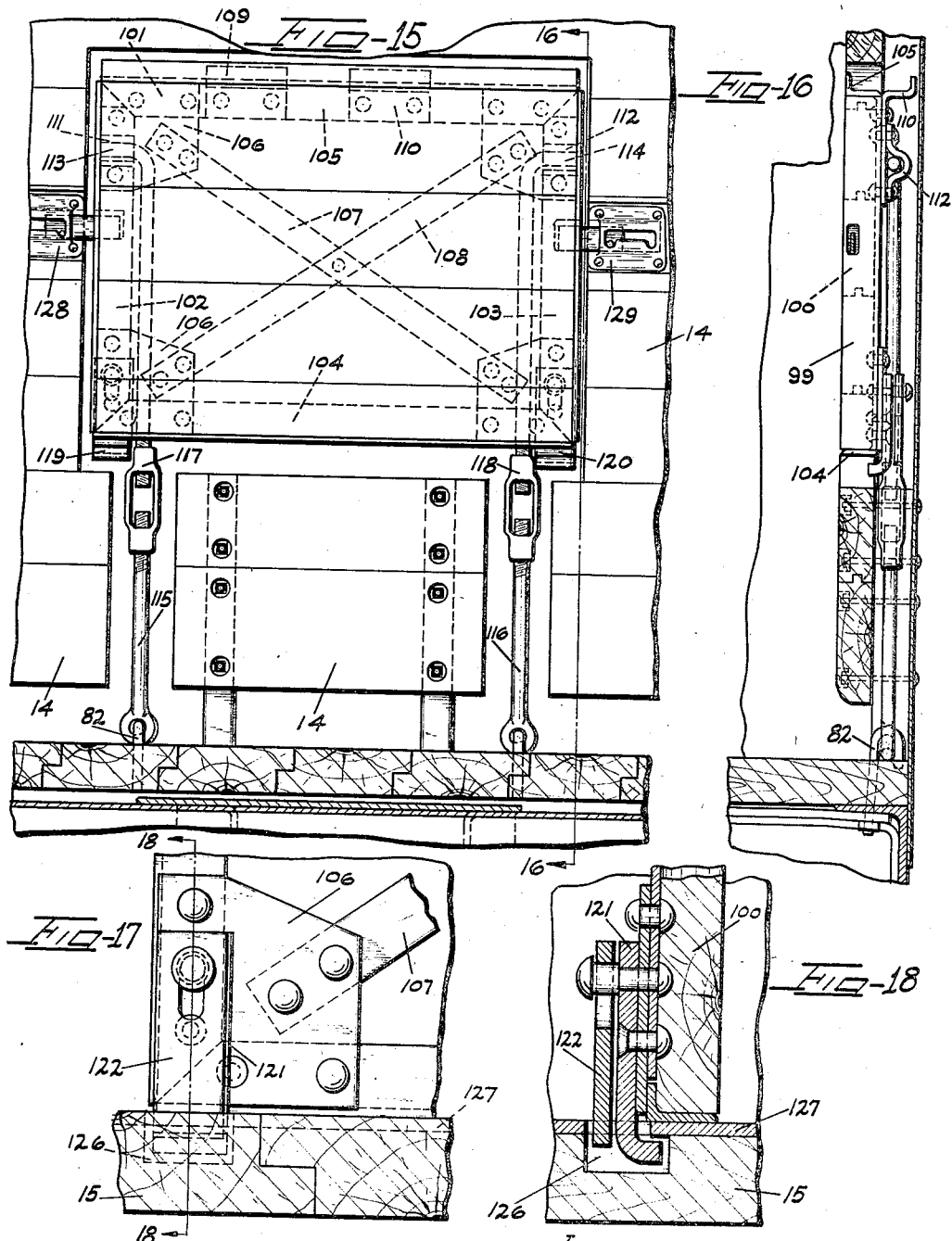

Patented Nov. 2, 1937

2,098,184

UNITED STATES PATENT OFFICE 2,098,184

AUTOMOBILE ELEVATING AND SUPPORTING STRUCTURE

Eugene J. Fehr, Hammond, Ind., and Kenneth J. Tobin, Chicago, Ill., assignors, by mesne assignments, to Evans Products Company, Detroit, Mich., a corporation of Delaware Application March 20, 1933, Serial No. 661,778

11 Claims. (Cl. 105—368)

This invention relates to automobile elevating and supporting structures.

It is an object of this invention to provide automobile elevating and supporting structures capable of ready installation in carrier vehicles, particularly of the railway house car type, with a minimum of modification of said vehicles and without affecting the utility of said vehicles for the shipment of other commodities therein.

A further object is to provide automobile elevating and supporting structures in which the force required to lift the automobiles is reduced to a minimum.

A further object is to provide automobile elevating and supporting structures in which the elevating friction is materially reduced.

A further object is to provide automobile elevating and supporting structures arranged to transfer the weight of the automobiles to the substructure of the vehicle in which the automobiles are to be transported.

A further object is to provide automobile elevating and supporting structures capable of adjustment to support automobiles of different widths.

A further object is to provide automobile elevating and supporting structures for carrier vehicles including bars movable to inoperative position within said vehicles and operating means movable upon said bars.

A further object is to provide automobile elevating and supporting structures comprising bars positioned between the innerlinings of the car sides and members carrying operating mechanism movable upon said bars.

A further object is to provide automobile elevating and supporting structures for railway house cars comprising bars movable to inoperative position in said cars and members carrying automobile engaging means and operating mechanism movable upon said bars.

A further object is to provide permanent automobile elevating structures for railway house cars comprising a bar and means movable upon said bar, said structures being mounted for disposal in said cars so as to permit transportation of commodities other than automobiles.

A further object is to provide novel bracing means for automobile supporting structures.

A further object is to provide novel elevating and supporting structures embodying bracing means.

A further object is to provide novel supporting and bracing means for railway house cars embodying a portion of the floor of said cars.

A further object is to provide novel supporting and bracing means for railway house cars embodying a portion of the lining of said cars.

A further object is to provide automobile supporting structures for railway house cars comprising bars and bracing means, said means being capable of being moved with said bars to inoperative position within the cars.

Other objects will become clear as the description of the invention proceeds.

In the drawings forming part of this specification:

Figure 1 is a side elevation of a railway house car with a side wall thereof removed showing the application of the invention for the shipment of automobiles;

Figure 2 is a transverse section taken on line 2—2 of Figure 1;

Figure 3 is a fragmentary view similar to Figure 1 on an enlarged scale showing an elevated automobile;

Figure 4 is a partial side elevation on an enlarged scale showing the supporting and elevating structure of the invention;

Figure 5 is an end view of Figure 4, parts being shown in section;

Figure 6 is a horizontal section taken on line 6—6 of Figure 4 with the automobile wheel shown in said figure omitted;

Figure 7 is a view similar to Figure 6 with the automobile wheel engaging member omitted and parts of the bracing mechanism illustrated in their inoperative positions;

Figure 8 is a fragmentary elevation, parts being shown in section illustrating the assembled position between the supporting structure and certain of the braces therefor;

Figure 9 is a horizontal section taken on line 9—9 of Figure 5;

Figure 10 is a view similar to Figure 4 showing a modified bracing and supporting structure;

Figure 11 is an end view of the structure shown in Figure 10 with parts in section;

Figure 12 is a horizontal section taken on line 12—12 of Figure 11;

Figure 13 is a view similar to Figure 4 showing a further modified bracing and supporting structure;

Figure 14 is an end view of the structure shown in Figure 13, parts appearing in section;

Figure 15 is an enlarged elevation showing the structure illustrated in Figure 14 in its stored or inoperative position;

Figure 16 is a vertical section taken on line 16—16 of Figure 15;

Figure 17 is an enlarged fragmentary elevation of a lower corner of the structure shown in Figure 13; and Figure 18 is a vertical section taken on line 18—18 of Figure 17.

Referring to the drawings a railway house car 10 is utilized for the purpose of illustrating the instant invention with the understanding, however, that said invention is applicable to vehicles of other types as well. The house car 10 comprises, generally, side walls 11 and 12 having wooden linings 13 and 14 which, as clearly illustrated in Figure 2 of the drawings, stop short of the floor 15 of the car. The side walls 11 and 12 embody metallic side plates 16 and 17 upon which the roof structure 18, comprising a plurality of spaced carlines 19 and roof sheets 20, is supported. The underframing of the car includes a center sill 21, bolsters 22 and 23 and side sills 24 and 25 which are connected to the bolsters 22 and 23.

It is to be noted from Figure 1 of the drawings that four automobiles are positioned within the house car 10 for transportation. In order to permit the shipment of four automobiles the two end automobiles are elevated so that sufficient space may be provided for two intermediate automobiles which, as illustrated, are positioned with their wheels supported upon the floor of the car. To provide the necessary space for the intermediate automobiles the end automobiles must be completely elevated above the floor of the car. The intermediate automobiles are fastened to the floor of the car by means of chain hold-down devices 26 which preferably embrace the wheels of the automobile and which have hooked engagement at their ends with anchoring devices 27 secured in the floor of the car.

The elevating and supporting structure of the instant invention is utilized to elevate and support one end of the elevated automobiles above the floor 15 of the car. This structure comprises, for each elevated automobile, a plurality of bars 28 and 29, positioned in transverse spaced relation with their upper ends secured respectively to the side plates 16 and 17. For the purpose of this securement the upper end of each of the bars 28 and 29 has attached thereto a member 30 provided with an elongated slot 31, as shown in Figure 3 of the drawings, through which a pin or rivet 32, supported in a bracket 33 secured to the side plates, extends. From their attachment to the side plates of the car the supporting bars 28 and 29 extend downwardly in converging relationship for a desired distance and then lie in parallel relationship perpendicular to the floor of the car. To provide the necessary strength in the supporting bars the parallel portions 34 and 35 thereof are of larger diameter than the converging portions 36 and 37. Each of these portions of the supporting bars is preferably tubular so that by the insertion of connecting members 38 and 39 in the adjacent ends thereof the said portions may be securely fastened together. Rivets 40 are shown for this purpose. In the supporting position of the bars 28 and 29 their lower ends are seated within members 41 secured preferably in the floor of the car and providing upwardly opening channels 42 extending transversely of the car. It is apparent that by this construction the weight, which may be incident upon the supporting bars, will be transferred to the underframe of the car and will not be carried by the roof or superstructure thereof. Seating of the lower ends of the bars within the members 41 may be obtained in view of the provision of the elongated slot 31 in the member 30. By means of this provision, furthermore, and the transversely extending upwardly opening channel formed in each of the members 41 the supporting bars 28 and 29 may be adjusted toward or away from each other so as to render them capable of supporting automobiles of different widths.

Each of the parallel portions 34 and 35 of the supporting bars 28 and 29, respectively, is provided with an automobile supporting and elevating device. Each of the portions 34 and 35 is provided with a rack bar 43 secured in any desired manner to said parallel portions of the bar and preferably to that part of each of the bars adjacent the linings 13 and 14 of the car. A sleeve 44 is slidably mounted upon each portion 34 and 35 and carries a housing 45 within which operating mechanism, comprising a worm 46, a worm gear 47 meshed with the worm 46 and a pinion 48 mounted upon a shaft 49 which carries the worm gear 47, is housed.

The sleeve 44 is provided, additionally, with vertical spaced flanges 50 and 51, respectively, which in turn carry the inwardly directed flanges 52 and 53. As clearly shown in Figure 9 of the drawings, this flange structure extends oppositely from the housing structure provided on the sleeve and the inwardly directed flanges 52 and 53 lie in spaced relation to the sleeve. The space between the inturned flanges 52 and 53 and the sleeve as well as the space between said inturned flanges is covered at the bottom of said flanges by means of a wall 54. By virtue of the construction of the flanges above referred to the sleeve 44 is adapted to interlockingly receive the wheel engaging and support-member 55 provided with outwardly turned flanges such as 56 received within the spaces between the inturned flanges 52 and 53 and the wheel receiving member. In this position the wheel engaging and supporting member 55 is adapted to rest upon the wall 54. In view of the fact that the pinion 48 is positioned in meshing engagement with the rack bar 43 the sleeve 44, together with the operating mechanism and the wheel supporting member 55 will move as a unit upon a vertical portion 34 or 35 of the supporting bars upon actuation of the crank 57 which may be utilized with the operating mechanism. It may be observed that by the provision of a pinion 58 secured to the worm 46 and a reversible pawl the crank 57 may be used for ratchet as well as continuous movement.

In loading the automobiles into the car 10 the end automobiles are loaded first and given their elevated position. To this end the automobile wheel engaging and supporting members are positioned through actuation of the operating devices upon the floor of the car. The wheels at one end of the automobile are then placed in their respective supporting members whereupon movement of the operating devices upon actuation of the crank 57 in the proper direction will effect elevation of said end of the automobile. The wheels at said end may then be fastened to their supporting members by means of the hold-down chains 26 and said supporting members properly braced. The other end of the automobile, the front end as illustrated in Figure 1 of the drawings, may then be hoisted by any desired means and the wheels at said end positioned within supporting members 59 adjustably secured to bars 60 pivoted, as indicated at 61, to the side plates of the car. As clearly shown in Figure 3 of the drawings each of these wheels is fastened to its supporting member by means of a hold-down device 26. After this operation has been carried out with regard to each of the end elevated automobiles the intermediate automobiles may be loaded into the car and fastened to the floor thereof as hereinbefore set forth.

In order to properly brace the elevated end of the automobile which is supported upon the bars 28 and 29 the present structure illustrated in Figures 1 to 9, inclusive, may be employed. This structure comprises a plurality of oppositely extending channel bars 62 and 63 pivotally fastened, as indicated at 64, to a collar 65 secured adjacent the lower end of each of the supporting bars. Bars 66 and 67 are pivotally secured to the channel bars 62 and 63 adjacent the outer ends thereof. The outer ends of each of the bars 66 and 67 are formed with hook portions 68 and 69, respectively, each of which, as clearly shown in Figure 4 of the drawings, is adapted to lie within an anchoring device 27 and engage under a cross member 70 carried by said anchoring device. The opposite ends of the bars 66 and 67 are turned upwardly, as indicated at 71 and 72, and are adapted to be received between the spaced flanges 73 and 74 depending from the underside of the wheel supporting member 55. These ends of the bars are adapted to be engaged with said flanges by means of pins 76 and 77 extending through aligned openings formed in said ends and said flanges.

Additionally, brace bars 78 and 79 are utilized. These bars, as clearly shown in Figure 4 of the drawings, embody the turnbuckles 80 and 81 whereby they are rendered adjustable. One end of each of the bars 78 and 79 is pivotally fastened at a side wall by means of bolts 82 in such manner that in their inoperative position these bars may be retained upon the floor of the car under the lining of the side walls by means of clips C pivotally secured to the inner lining, as shown in Figure 8 of the drawings. The opposite ends of the brace bars 78 and 79 are adapted to be secured to the depending flanges 73 and 74 of the automobile wheel supporting members by means of the pins 76 and 77 which secure the brace bars 66 and 67 thereto. By this construction it is apparent that an effective bracing is provided for the wheel supporting members carried upon the supporting bars 28 and 29.

After the automobiles have been unloaded from the car 10 the supporting bars, the bracing means and the bars 60 may be stored in inoperative position within the car so that said car may be utilized for the shipment of any other commodities. The pins 76 and 77 which secure certain of the ends of the brace bars 66—67 and 78—79 to the wheel supporting member are withdrawn. The wheel supporting members are disengaged from the sleeves 44 and, together with the hold-down chains, may be stored in receptacles provided on the car below the floor. The bars 66 and 67 are then positioned within the channel bars 62 and 63, as shown in Figure 7 of the drawings. The channel bars are then swung about their pivotal connections 64 into a vertical plane adjacent the supporting bars 28 and 29 and are secured to said bars by means of chains 83 carried by said bars and engaging the hooked portions 68 and 69 formed on the brace bars 66 and 67. The bars 28 and 29 may then be lifted out of the members 41 and swung about their upper ends to a position adjacent the roof of the car and supported by means of rings 84 through which the ends of the bars 28 and 29 extend. In this position disengagement from the rings is avoided by means of toggle bolts or pins 85 secured to one of the carlines of the roof construction. The brace bars 78 and 79 are then positioned under the linings 13 and 14 as above referred to. The wheel supporting members 59 and the hold-down chains may also be removed from the bar 60 and stored within said receptacles, whereupon the bars 60 may be swung to position adjacent the roof of the car and supported there by means of hooks.

While the present means shown in Figures 1 to 7, inclusive, has been referred to simply as bracing structure it is clear that such means may be and preferably is used to support the weight of the rear end of the automobile and thus relieve the bars 28 and 29 and the lifting mechanism of this function. This is accomplished by lowering the wheel engaging members 55 until the weight of the rear end of the automobile has been transferred to the bars 66 and 67, the lower ends of which abut against the anchoring devices 27 to resist the thrust thus imposed upon said bars. The hook portions 68—69 of said bars engage the cross members 70 and the anchoring devices and aid in preventing longitudinal and elevating movements of said bars. In Figures 10 to 18, inclusive, modified structures are illustrated which are capable of bracing and more effectively carrying the load of the rear end of the automobile, thus preventing stresses from being set up in the elevating mechanism bars 28 and 29. The modification shown in Figures 10 to 12, inclusive, includes a bracing and supporting member 86 which constitutes in its inoperative position a portion of the floor of the car. This member, as clearly shown in Figure 12 of the drawings, is formed preferably of wooden floor boards 87 disposed within the flanged metallic reinforcing plate 88. The end of the member 86 adjacent the side wall of the railway house car is pivoted to the substantially Z-shaped members 89 and 90 which, together with the plate member 91, provide a metallic frame for the opening 92 formed in the floor 15 of the house car and within which the member 86 is received in its inoperative position. The pivotal connection between the member 86 and the frame referred to is indicated at 93. It will be observed that the plate 91 overlaps the adjacent edge of the floor at the opening 92 therein as indicated at 94 in order to close the joint which is formed between the member 86 and said edge of the floor when said member is positioned in the opening.

In order to utilize the bracing and supporting member 86 the wheels of one end of an automobile are elevated above the floor of the car. The member 86 may then be swung from its horizontal to a vertical position as clearly shown in Figure 11 of the drawings. In this position said member lies beneath the wheel engaging and supporting member 55. After the member 86 has been given its vertical position the wheel receiving member is lowered until it rests upon the upper end of the bracing and supporting member. The weight of the illustrated end of the automobile is preferably sustained by said bracing and supporting member which, additionally, is notched out as indicated at 95 in order to provide a seat for the reception of reinforcement ribs 96 so as to prevent longitudinal movement of the wheel engaging member relative to the member 86. A plurality of adjustable braces 97 pivotally secured to the bolt 82 positioned adjacent the side wall of the railway house car may be utilized to maintain the member 86 in its vertical position. The free ends of the bracing members 97 extend through links 98 carried by the wheel engaging members 55 and into the bracing and supporting member 86 for this purpose. It will be evident that by the extension of the free ends of the bracing members 97 through the links 98, accidental vertical displacement of the wheel engaging members 55 will be avoided. It is apparent that the bracing and supporting member 86, after the automobile has been taken from the railway house car will be disposed within the opening 92 so as to complete the floor structure 15 of the car and permit the shipment of other commodities therein.

A further modified bracing and supporting construction is illustrated in Figures 13 to 18, inclusive. In this construction the bracing and supporting member 99 comprises the wooden portion 100 positioned within a metallic frame 101. This frame may, as clearly shown in the drawings, be formed of vertical angle members 102 and 103, a horizontal angle member 104 and a top horizontal Z-bar 105. Gusset plates 106 may be utilized to secure the frame members together and diagonal braces 107 and 108 connected to the gusset plates may be utilized to reinforce the member 99. A plurality of spaced clips 109 and 110 are secured to the upper portion of the member 99 and cooperate with the Z-shaped frame member 105 for a purpose hereinafter described. The vertical margins of the bracing and supporting member 99 carry eyes 111 and 112 which receive pintles 113 and 114 provided by the outturned ends of bracing rods 115 and 116. These bracing rods are rendered adjustable by means of the turnbuckle constructions 117 and 118 and the lower ends of said rods are pivotally retained adjacent the side wall of the railway house car by means of the J bolts 82. Adjacent the lower corners of the bracing and supporting member latches 119 and 120 are provided. Each of these latches, as clearly shown in Figures 17 and 18 of the drawings, comprises a hooked shaped member 121 rigidly secured to the member 99 and the vertically movable and pivoted member 122.

The above described bracing and supporting structure is shown in its operative position in Figures 13 and 14 of the drawings. In this position the member 99 is disposed vertically so as to underlie and support the wheel engaging member 55 in order to carry the weight of the portion of the automobile disposed in said member. As clearly appears in Figure 13 of the drawings, the wheel engaging member 55 is provided with a strap 123, the ends of which are upturned and riveted to flanges provided on the wheel engaging member 55, as indicated at 124 and 125. The intermediate portion of this strap is narrower in width than the ends thereof so as to be capable of disposal between the upturned flanges of the Z-shaped framing member 105 and the Z-shaped clips 109 and 110. By this construction it is apparent that relative longitudinal shifting between the buckets and the bracing and supporting member 99 is prevented. The member 99 is maintained in its operative position by means of the latches 119 and 120. As clearly shown in Figures 14 and 18 of the drawings the floor 15 adjacent the member 99 is gained out as indicated at 126 and this gained portion covered in part by means of a metallic plate 127 which, as appears in Figure 18, extends into the gained out portion 126. In positioning the member 99, then, the hook member 121 is positioned within the gained out portion 126 so as to lie in overlapping relationship with the inwardly extending part of the plate 127 and to prevent accidental disengagement of the bottom of the bracing and supporting member 99 from the plate 127 the slidable and pivotal member 122 is positioned within the gained out portion 126. The bracing rods 115 and 116, also, serve to maintain the member 99 in its operative position. It clearly appears from Figure 13 of the drawings that the wheel received within the wheel engaging member 55 may be secured to said member by means of a chain holddown device.

In its inoperative position the bracing and supporting member 99 as utilized constitutes a portion of the inner lining of the side wall of the railway house car. As clearly shown in Figures 15 and 16 of the drawings the member 99 is swung upwardly into alignment with the fixed lining 14 of the car and supported in this position by means of the bracing rods 115 and 116. To maintain said member in the position indicated any desired means, such as latching devices 128 and 129, may be utilized.

To dispose the member 99 in its above described operative relationship with the floor of the car the latching devices 128 and 129 are retracted and said member moved downwardly. During this movement the lower ends of the bars 115 and 116 swing downwardly about the bolts 82 while the member 99 swings about the pintles 113 and 114 formed on the upper ends of said bars, whereby said member may assume the vertical position shown in Figures 13 and 14. To move the member 99 to inoperative position it is released from its engagement with the floor by swinging the pivoted members 122 out of the gained out portions 126 of the floor and the hook members 121 disengaged from the floor plates 127. The member 99 may then be swung upwardly about the bars 115 and 116 into the position shown in Figures 15 and 16 where it is maintained by the latching devices 128 and 129.

It is apparent that numerous changes and modifications in the details of the invention will be clear to those skilled in the art. It is intended, therefore, that all such modifications and changes be comprehended within this invention, which is to be limited only by the scope of the claims appended hereto.

We claim:

1. In a railway house car, an automobile elevating and supporting structure comprising a plurality of opposed transversely spaced substantially vertical members, means mounted upon each of said members capable of sliding movement thereon, operating mechanism carried by each of said means for imparting movement thereto and automobile engaging and supporting devices attached to said means and lying between said members, said members being adjustable toward and away from each other to support automobiles of different widths.

2. In an automobile elevating and supporting structure for carrier vehicles comprising, in combination, substantially vertically extending means, a member carrying an automobile supporting element mounted upon said means capable of movement thereon and operating mechanism carried by said member, said means and said operating mechanism having operatively engaged devices, whereby said operating mechanism is capable of movement upon said means to impart vertical movement to said member and supporting element, said means being swingably secured in a railway house car to enable said means, said member and said operating mechanism to be swung to inoperative position adjacent the roof of said car.

3. An automobile supporting structure for carrier vehicles comprising, in combination, a substantially vertically extending member, substantially horizontal arms secured to and extending in opposite directions from said member, automobile supporting means slidably embracing said member and bars secured to said horizontal arms and said automobile supporting means.

4. In a railway house car, in combination, a substantially vertically extending member in said car, oppositely extending arms secured to said member adapted to be positioned upon the floor of said car, automobile supporting means carried by said member and bars pivotally secured to said arms and adapted to be connected to said automobile supporting means.

5. In a railway house car, in combination, a substantially vertically extending member in said car, oppositely extending substantially channel shaped arms pivotally secured to said member adapted to be positioned upon the floor of said car, automobile supporting means carried by said member and bars pivotally secured to said arms and adapted to be connected to said automobile supporting means, said bars in inoperative position being seated in said channel shaped arms whereby said arms and said bars may be swung adjacent said vertically extending member and means for fastening said bars and arms to said latter member.

6. In a railway house car having a floor, in combination, a substantially vertically extending member, automobile supporting means carried by said member, and means secured to and adapted to lie in said floor, said means being swingable to vertical position to support said automobile supporting means and transmit the load thereon to the substructure of the car.

7. In an automobile elevating and supporting structure for carrier vehicles, in combination, substantially vertically extending means, a member mounted upon said means capable of movement relative thereto, automobile engaging means attached to and movable with said member, operating mechanism carried by said member for imparting movement thereto and means for bracing said automobile engaging means, said bracing means extending from said automobile engaging means downwardly to said vehicle whereby said bracing means is adapted to support said automobile engaging means and carry the load imposed thereon to said vehicle.

8. In a railway house car having a floor and an inner lining, in combination, a substantially vertically extending member, automobile supporting means carried by said member, means adapted to be disposed beneath and in engagement with said automobile supporting means and said floor to support said latter means and carry the weight thereof to said car, said second mentioned means in the inoperative position thereof constituting a portion of the lining of said car.

9. In a railway house car having a floor and a side wall provided with a lining, a portion of said lining being bodily removable for disposition vertically upon the floor of the car to constitute an automobile supporting member, means for reinforcing said portion of said lining and releasable means carried by said portion of the lining for securing the same in operative position to the the floor of said car.

10. An automobile decking device for railway freight cars and the like, said device comprising vertically disposed means, means securing said vertically disposed means at its upper end in said car for longitudinally swingable movement to inoperative position adjacent the roof of said car, a member slidably mounted upon said vertically disposed means, automobile engaging means carried by said member and operating mechanism carried by said member, said mechanism being associated with said vertically disposed means for imparting sliding movement to said member, whereby said device in its operative position is capable of elevating and supporting said automobile in elevated position and in inoperative position, said vertically disposed means together with said member and its operating mechanism are capable of disposition adjacent the roof of said car.

11. An automobile decking structure for the transportation of automobiles in railway house cars and the like comprising a plurality of separate opposed units, each of said units having a vertical member hinged at its upper end adjacent the roof of said car for swinging movement longitudinally of said car, said member extending substantially to the floor of said car, a self-contained device carrying operating mechanism mounted upon said member for movement therealong, automobile supporting means adapted to receive a wheel of said automobile carried by said device, said device being operable to dispose said means upon the floor of said car for receiving said automobile wheel and to elevate said automobile above said floor and means for fastening said wheels to their respective supporting means, said units being independently swingable to a position adjacent the roof of said car for the purpose set forth.

EUGENE J. FEHR.
KENNETH J. TOBIN.